United States Patent [19]
Levitt et al.

[11] Patent Number: 5,587,936
[45] Date of Patent: Dec. 24, 1996

[54] METHOD AND APPARATUS FOR CREATING SOUNDS IN A VIRTUAL WORLD BY SIMULATING SOUND IN SPECIFIC LOCATIONS IN SPACE AND GENERATING SOUNDS AS TOUCH FEEDBACK

[75] Inventors: David A. Levitt, Menlo Park; Marc Degroot, San Francisco; Jaron Z. Lanier, Palo Alto, all of Calif.

[73] Assignee: VPL Research, Inc., Redwood City, Calif.

[21] Appl. No.: 141,203

[22] Filed: Oct. 5, 1993

Related U.S. Application Data

[63] Continuation of Ser. No. 621,446, Nov. 30, 1990, abandoned.

[51] Int. Cl.$^6$ .................................................. G06F 17/00
[52] U.S. Cl. ........................................................... 364/578
[58] Field of Search .............................. 395/500; 381/17, 381/77, 61; 364/578

[56] References Cited

U.S. PATENT DOCUMENTS

| | | | |
|---|---|---|---|
| 3,665,105 | 5/1972 | Chowning | 381/17 |
| 4,048,442 | 9/1977 | Minnila et al. | 381/1 |
| 4,227,050 | 10/1980 | Wilson | 381/24 |
| 4,504,933 | 3/1985 | Janney | 367/197 |
| 4,569,074 | 2/1986 | Polk | 381/24 |
| 4,630,298 | 12/1986 | Polk et al. | 381/1 |
| 4,817,149 | 3/1989 | Myers | 381/1 |
| 4,884,219 | 11/1989 | Waldren | 364/514 |
| 5,052,685 | 10/1991 | Lowe et al. | 273/460 |
| 5,105,462 | 4/1992 | Lowe et al. | 381/17 |
| 5,208,860 | 5/1993 | Lowe et al. | 381/17 |

*Primary Examiner*—Krisna Lim
*Attorney, Agent, or Firm*—Oblon, Spivak, McClelland, Maier & Neustadt, P.C.

[57] ABSTRACT

A method and apparatus for creating sounds in a virtual world. The system provides signal processing capabilities to convert monaural sounds to fully spacialized sound sources. A user of the system wearing a pair of stereo headphones perceives live, computer generated, or recorded sounds as coming from specific locations in space, just a listener does in the real world.

16 Claims, 1 Drawing Sheet

METHOD AND APPARATUS FOR CREATING SOUNDS IN A VIRTUAL WORLD BY SIMULATING SOUND IN SPECIFIC LOCATIONS IN SPACE AND GENERATING SOUNDS AS TOUCH FEEDBACK

This is a continuation, of application Ser. No. 07/621,446, filed on Nov. 30, 1990 now abandoned.

BACKGROUND OF THE INVENTION

This invention relates to virtual reality systems and, more particularly, to a method and apparatus for creating sounds in a virtual world.

Users of computer systems are now able to create virtual realities which they may view and interact with. One type of virtual reality system is disclosed in U.S. patent application No. 535,253, filed Jun. 7, 1990, entitled "Virtual Reality Network," the disclosure of which is incorporated herein by reference. One task which must be performed is the creation of the virtual worlds within which the users interact. The virtual world should simulate the real world as closely as possible. Thus, not only must the animated world be created, but the sounds which one would expect to exist in the virtual world must also be provided.

SUMMARY OF THE INVENTION

The present invention is directed to a method and apparatus for creating sounds in a virtual world. The system provides signal processing capabilities to convert monaural sounds to fully spacialized sound sources. A user of the system wearing a pair of stereo headphones perceives live, computer generated, or recorded sounds as coming from specific locations in space, just a listener does in the real world.

BRIEF DESCRIPTION OF THE DRAWINGS

FIG. 1 is a block diagram of a system for creating sounds in a virtual world. There is a computer 4 such as a Macintosh computer having as an input device a data glove 2 such as the VPL data glove. The computer 4 is used to create and manipulate a virtual world. There is a MIDI interface 6 connected between the computer 4 and a sound synthesizer 8. The sound synthesizer 8 may be implemented by the EMAX II sound synthesizer from EMU Systems, Inc. The sound synthesizer is used to generate sounds and has a main, A, B, and C audio channels. The sound synthesizer may store new sounds which are input through microphone 10 connected to a transformer 12 through a preamplifier/mixer 14. A sound database may be stored on a floppy disk and inserted into the sound synthesizer 8. The sounds may be cataloged into different worlds such as a kitchen including a clock, fan and faucet sounds, sounds relating to an electronic component such as a motherboard including a chip buzz, crackle, and click sounds, and the sound of a city on the water including the sound of a ferry, a seagull, crashing waves, a restaurant, and a whale. Further, sounds may be included relating to the operation of the data glove 2 including an ambient hand sound, a grab sound, a hit sound, and a release sound. The sounds output by the sound synthesizer are sent through the preamplifier/mixer which may be implemented as the Rane SM26 'Swiss Army' mixer having six inputs and six outputs.

Figure 1:
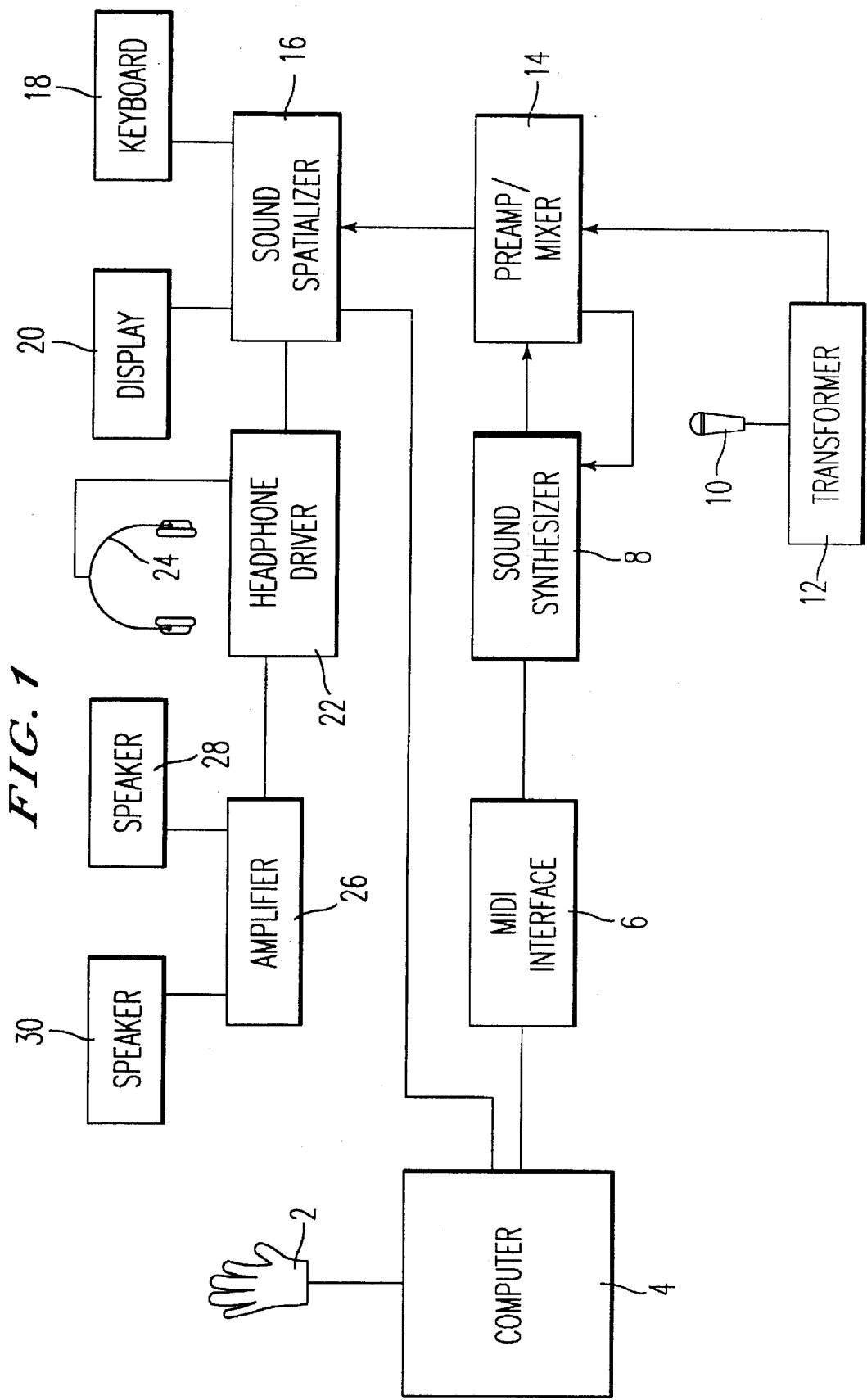
FIG. 1 is a block diagram of a particular embodiment of an apparatus according to the present invention for creating sounds in a virtual world.

There is a sound spatializer 16 connected to the output of the preamplifier/mixer and to the computer 4 through a serial cable. The sound spatializer 16 may be implemented as the AudioSphere sound spatializer from VPL Research, Inc. Included in the sound spatializer 16 is a program entitled "Convolvotron", designed by Scott Foster of Crystal River Engineering, Inc., which performs signal processing tasks to convert mono sound sources such as sound from the sound synthesizer 8 to three-dimensional sound sources which can be heard over stereo headphones or speakers. The sound spatializer 16 has connected thereto a keyboard 18 and a display 20 to control the operation and parameters thereof.

Connected to the sound spatializer 16 is a headphone driver 22 connected to a pair of stereo headphones 24. There is also an amplifier 26 connected to the headphone driver 22 connected to two speakers 28 and 30.

AudioSphere contains several innovations, including:

1: Acoustic touch feedback using spatialized acoustic cues for "Grab/Hit/Unhit"

2: Simulated and exaggerated Doppler shift cues using MIDI PitchBend;

3: Parallel processing architecture, where rendering and other computations happen in a separate processor, connected to the host by a low-bandwidth channel Another item: MIDI-based generation of real-time sound effects in VR (virtual reality). This item is a prerequisite for 2, and a subsystem in our implementation of 1 and 3.

1: Touch Feedback

Touch feedback is a valuable element of computer/human interface, particularly when using the hand to grab simulated or "virtual" objects, as with hand-measuring devices like the VPL (a company which develops virtual reality products) DataGlove. The present invention uses sound rather than tactile feedback to indicate correct gesture for grabbing objects (Grab), actual contact with a grabbable object (Hit), and release of a previously Hit object (Unhit or Release). In our implementation, the sound is three-dimensionally rendered and appears to come from the user's hand, but that need not be a requirement of the patent claim. Also, MIDI control of digitally sampled sound is our synthesis method, but that should not be a prerequisite of the claim.

In our invention, sound feedback indicates several things:

Grab: whether the current hand gesture allows the object to be picked up (Grab gesture). In the current implementation a grab gesture results in a continuous sound that continues until the hand intersects with a grabbable object. We use a sound of continual suction sound, "sssss" to indicate the hand's potential for picking up an object. This suggests a "vacuum suction" model of picking up objects, rather than closure of the fingers around the object, and helps the user make a correct assumption about the user interface.

Hit: whether the hand has intersected with the object to be picked up (Hit) object can be grabbed now. In the Virtual Reality system, motion of the object now follows motion of the hand. The Hit sound can be continuous until the object is released, but in the case of the vacuum suction model, the sound is "ssssp!" Another sound can continue while the object is being held, although in a system with other feedback (e.g., graphics) this is not necessary.

Unhit: whether the Grab gesture has ended and the currently held object has been released. If the vacuum suction model, we use a sound of reverse suction, again followed by silence: "Psssss."

2: Doppler Shift

In the physical world, Doppler shift Is the increase or decrease of the pitch of a sound in accord with the speed of the object (rate of change of radial distance) relative to the listener. When a listener and object move toward each other, the pitch of a sound emanating from the object-goes up when heard by the listener. When they are moving away from each other, the pitch goes down. The amount of pitch change is proportional to the fractional speed (rate of change of radial distance) of the objects relative to the speed of sound (about 600 miles per hour at common earth pressure and temperature). Thus the pitch of an object moving toward the listener at 60 mph is raised by about 10%.

AudioSphere, in conjunction with Body Electric and its DM's, generates Doppler shifts by raising and lowering the pitch using MIDI PitchBend capability built in to many modern music synthesizers. On synthesizers with polyphonic pitch bend capabilities, like the EMAX II synthesizer used in the current AudioSphere, several different soured sources can be doppler shifted at once. MIDI provides a low-bandwidth (typically 30 samples per second) method for the host computer and Body Electric to shift pitches of sounds emitted from objects in simulations, visual reality, and other applications of AudioSphere.

MIDI Is a hardware/software standard for generating and controlling sound in real-time on a low-bandwidth channel (31.25 Kbaud). MIDI PitchBend is a 14 bit quantity that takes a range of values from 0 to 16,383. The lowest downward bend value is 0 and the highest pitch bend is 16,383, with a middle value of 8192 indicating no bend.

The Body Electric DMs allow the designer to specify the objects that have Doppler shifting, and to create attenuated or exaggerated doppler shifts as objects in the model move. The value for the PitchBend is determined by this formula:

$$PitchBend = 8192 + (ScaleFactor * (Speed/SpeedOfSound))$$

Speed is computed as the rate of change of radial distance between the object and the ear, using the GlobalDistance DM in Body Electric. Speed is positive when the distance is increasing, negative when the object moves toward the listener. The sign of the ScaleFactor is negative so when two objects are moving toward each other, the PitchBend value goes up. The ScaleFactor can be adjusted depending on the specific PitchBend response of the MIDI synthesizer, which typically ranges for +12% to +200%. The ScaleFactor or SpeedOfSound constants can be set to simulate very rapid motion, i.e. motion over great distances with a correspondingly dramatic pitch shift due to doppler when the object passes by.

Exaggerated doppler shift and exaggerated rolloff of sound loudness with distance may be useful claims in an AudioSphere patent. Sound rolloff can be proportional to the distance, the distance squared, or any other exponent. The "cartoony" exaggerations heighten the VR or other user's perception of space and motion in the application.

3: Parallel processing architecture

AudioSphere uses one or more peripheral processors to compute sound parameters for the 3D spatial sound rendering module(s), limiting the amount of computation that needs to be done on the central host running Body Electric. Current AudioSphere code runs on an IBM-PC compatible with a 80386 and 387 math processor. Body Electric sends the peripheral processor cartesian coordinates relative to the head (from the center between the ears). The peripheral processor performs conversion from cartesian (x, y, z) coordinates to the spherical (azimuth, elevation, and radius) coordinates required by the 3D sound spatializer (in this case, the Convolvotron subsystem).

Sending head-relative cartesian coordinates lets the peripheral processor preform the relatively expensive trigonometry without taxing the host processor as much as a uniprocessor system, increasing the real-time performance of the system. At the same time, the head-relative cartesian representation, generated using FollowPoint DMs in Body Electric, simplifies the computation in the peripheral processor, which does not need an ongoing model of the head's coordinates in the world, only of the fixed distance between the ears and the filtering properties of the head.

While the above is a complete description of a preferred embodiment of the present invention, various modifications may be employed. Consequently, the scope of the invention should not be limited except as described in the claims.

What is claimed is:

1. An audio feedback system for use with a virtual reality system, comprising:

means for calculating a virtual world;

a sensor, connected to the means for calculating, for sensing information of a person's hand;

an audio feedback determining means, connected to the means for calculating and the sensor, for determining if audio feedback is to be generated, using information of the virtual world and the information of the person's hand; and a sound generator for generating sound in response to the determination made by the audio feedback determining means.

2. A system according to claim 1, wherein the audio feedback determining means includes:

means for determining audio feedback is to be generated which indicates an object in the virtual world is grabbable using information of the virtual world and the information of the person's hand.

3. A system according to claim 1, wherein the audio feedback determining means includes:

means for determining audio feedback is to be generated which indicates an object in the virtual world can be picked up using information of the virtual world and information of the person's hand.

4. A system according to claim 1, wherein the audio feedback determining means includes:

means for determining audio feedback is to be generated which indicates an object which was held in the virtual world has been released using information of the virtual world and information of the person's hand.

5. A system according to claim 1, wherein:

the audio feedback determining means operates without analyzing an orientation of the person's head.

6. A system according to claim 1, wherein:

the sensor senses gestures made by the person's hand.

7. A system according to claim 1, wherein the audio feedback determining means comprises:

means for determining a predetermined sound is to be generated using information of the virtual world and information of the person's hand.

8. A method of generating audio feedback, comprising the steps of:

creating a virtual world;

sensing information of a person's hand;

determining if audio feedback is to be generated using information of the virtual world and the information of the person's hand; and generating sound when the determining step determines that audio feedback is to be generated.

9. A method according to claim 8, wherein the step of determining if audio feedback is to be generated comprises:

determining audio feedback is to be generated which indicates an object in the virtual world is grabbable using information of the virtual world and the information of the person's hand.

10. A method according to claim 8, wherein the step of determining if audio feedback is to be generated comprises:

determining audio feedback is to be generated which indicates an object in the virtual world can be picked up using information of the virtual world and the information of the person's hand.

11. A method according to claim 8, wherein the step of determining if audio feedback is to be generated comprises:

determining audio feedback is to be generated which indicates an object in the virtual world which was held in the virtual world has been released using information of the virtual world and the information of the person's hand.

12. A method according to claim 8, wherein the step of determining if audio feedback is to be generated comprises:

determining if audio feedback is to be generated without analyzing an orientation of the person's head.

13. A method according to claim 8, wherein the sensing step comprises:

sensing gestures made by the person's hand.

14. A method according to claim 8, wherein the determining step comprises:

determining a predetermined sound is to be generated using information of the virtual world and the information of the persons's hand.

15. A method of generating audio feedback in a virtual world, comprising the steps of:

creating a virtual world include a virtual object;

sensing information of a person's hand;

generating a first sound when the information sensed of the person's hand and the virtual object make the object grabbable;

generating a second sound when the information sensed of the person's hand and the virtual object indicate that the hand has intersected the virtual object; and generating a third sound when the information sensed of the person's hand and indicates that the object is released.

16. A method according to claim 15, wherein:

the steps of generating the first, second, and third sounds generate different sounds.

* * * * *